March 18, 1952   C. J. PAUL   2,589,626
ROASTER
Filed July 28, 1950
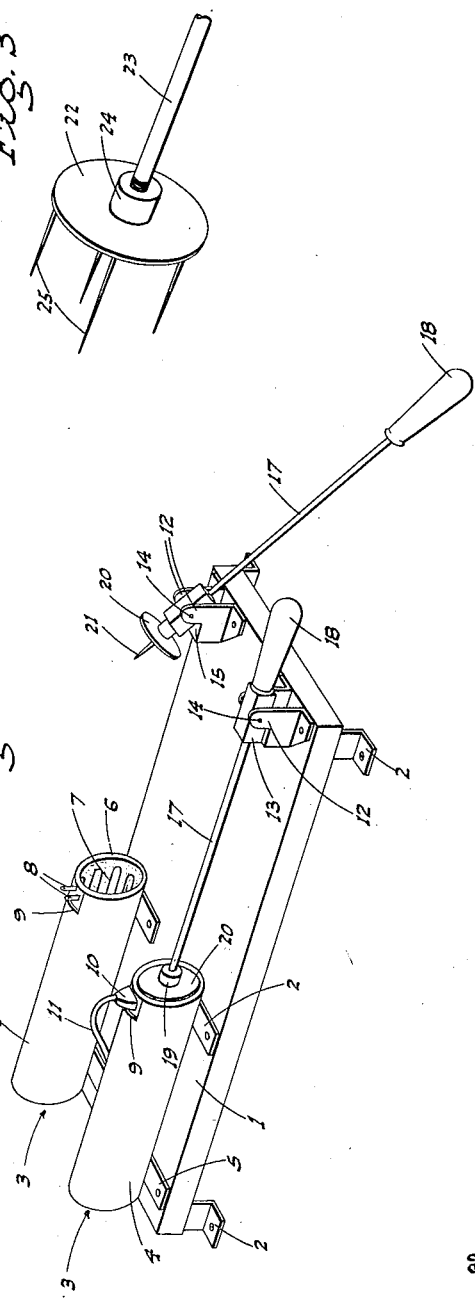
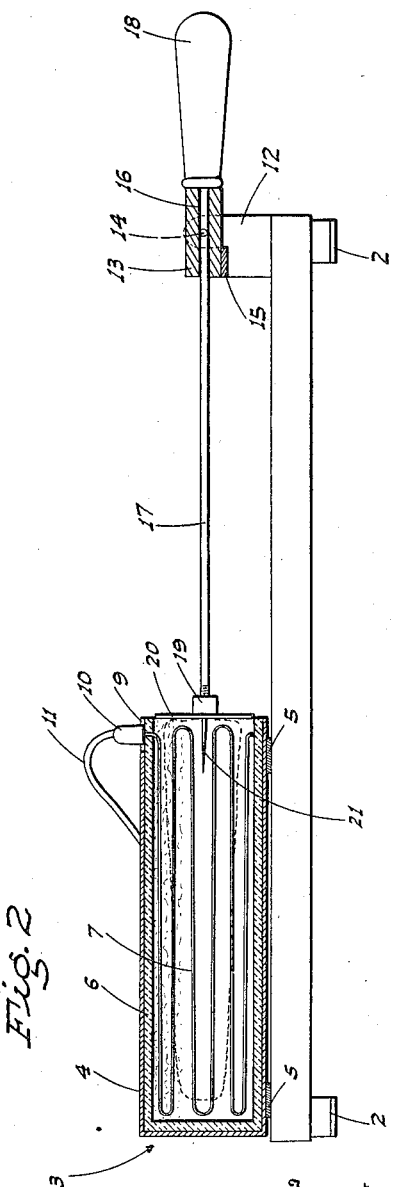
Inventor
Clifton J. Paul
By
ATTORNEYS Patented Mar. 18, 1952

2,589,626

UNITED STATES PATENT OFFICE 2,589,626

ROASTER

Clifton J. Paul, Del Paso Heights, Calif.

Application July 28, 1950, Serial No. 176,290

2 Claims. (Cl. 99—421)

This invention is directed to, and it is an object to provide, a novel electric roaster for food; the device being especially designed, but not limited, for use to roast ears of fresh corn.

Another object of the invention is to provide an electric roaster which comprises an arrangement whereby individual, elongated pieces of food, such as an ear of corn, may be roasted in a convenient manner; there being a plurality of roaster units for this purpose.

A further object of the invention is to provide each roaster unit with a novel device for supporting the food for placement and roasting in, and for removal from, a corresponding oven which is open at an adjacent end; there being means on the food supporting device to form a closure at said end of the corresponding oven when the food is disposed therein for roasting.

An additional object is to provide a roaster wherein each roaster unit includes a horizontal, cylindrical oven having a heat resistant lining and an electric heating element defining a circuitous course on said lining; the oven, as aforesaid, being open at one end for entry of the food and the electric element then surrounding said food.

A still further object of the invention is to provide a roaster wherein each food supporting device includes a slidable and tiltable shank, having a prong on its inner end; the shank thus being movable to position the prong a safe distance from the corresponding oven for placing uncooked food on or removing cooked food from said prong.

It is also an object of the invention to provide a roaster which is designed for ease and economy of manufacture and subsequent operation; the roaster being simple but sturdy, and handy to use.

Still another object of the invention is to provide a practical and reliable roaster, and yet one which will be exceedingly effective for the purpose for which it is designed.

These objects are accomplished by means of such structure and relative arrangement of parts as will fully appear by a perusal of the following specification and claims.

In the drawings:

Fig. 1 is a perspective view of the roaster.

Fig. 2 is an enlarged section elevation through one of the roasting units.

Fig. 3 is an enlarged fragmentary perspective view of a modified food supporting device.

Referring now more particularly to the characters of reference on the drawings, and at present to Figs. 1 and 2, the novel roaster comprises a horizontal base 1 supported at the corners from a table top or the like by feet 2.

Atop the base 1 there is disposed a plurality of roasting units, each indicated generally at 3. As each roasting unit 3 is identical, a description of one will suffice.

The horizontal base 1 is elongated, and each roasting unit 3 comprises a cylindrical oven 4 of substantial length, and such oven is disposed lengthwise of the base 1, overlying one end portion of the latter and being secured thereto by bottom attachment plates 5.

The inner end of each oven 4 is open, while the outer end is closed, and the oven is fitted with an internal lining 6 of asbestos or other heat resistant material.

On the inner face thereof the heat resistance lining 6 carries an electric heating element 7 of the tubular or encased type, such as is known under the trade name of "Calrod." The elongated heating element 7 defines a zig-zag or otherwise circuitous path in the oven for substantially the full length and circumference thereof whereby to surround an elongated piece of food, such as an ear of corn, supported in the oven in the manner hereinafter described.

The heating element 7 is connected, at its ends, to a pair of upstanding terminal pins 8 which project through a notched portion in the oven; electric current being supplied to the heating element 7 through the terminal pins 8 by means of a plug 10 on the end of an electric cord 11 which leads from a suitable outlet receptacle (not shown).

The horizontal base 1 extends some distance beyond the open inner end of each oven 4, and at the remote end such base 1 is fitted with a pair of transversely spaced, upstanding ears 12 in alinement with said oven.

A bearing block 13 is pivoted, intermediate its ends, between the ears 12 on a transverse axis 14 for swinging between a horizontal position, and an up-tilted position at its inner end. When the bearing block 13 is in horizontal position, it is prevented from down-tilting at its inner end by a horizontal stop 15 which spans between the ears 12.

Each bearing block 13 is formed with a longitudinal bore 16, and an elongated shank 17 slidably projects through such bore; the shank being fitted at its outer end with a handle 18, and being of a length such that when such handle 18 abuts the bearing block 13, the inner end of said shank is closely adjacent the corresponding end of the oven.

At its inner end the shank 17 is threaded into the hub 19 of a radial disc 20, the disc having a central prong 21 projecting therefrom opposite the shank.

Each roasting unit, as described above, is used as follows:

With the shank 17 retracted and tilted downwardly (see the uppermost unit in Fig. 1), the corresponding disc 20 and prong 21 are canted upwardly for ease and convenience of impaling an elongated piece of food, such as an ear of corn, on the prong 21 in abutment against the radial disc. The shank 17 is then raised to horizontal and advanced, whereby the supported ear of corn is projected into the corresponding oven 4, with the disc 20 then closing the open end of said oven (see Fig. 2.). With the parts in the above position, the elongated piece of food is effectively supported in the oven for roasting.

With certain types of food, or where more than one piece of food is to be supported, a modified disc and prong arrangement is employed, and which is shown in Fig. 3. In this modification the disc 22, as supported on the shank 23 by a hub 24, is fitted with a plurality of symmetrically spaced prongs 25; the disc 22 being used in lieu of the disc 20.

The described roaster provides a very practical, reliable and convenient device for the roasting of individual pieces of food, and when the food in each oven is cooked it may be withdrawn independently of the food in the other ovens; it being understood that the device in practice may incorporate a substantial number of the roasting units 3.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A food roasting unit comprising a base, an elongated horizontal cooking oven on the base, the oven being open at one end, an elongated shank having a food engaging prong on one end adapted to enter the open end of the oven, a block through which the shank is slidable, and means pivotally mounting the block on the base on a horizontal transverse axis and at a point back from the oven for swinging of the block and shank from a horizontal position centrally alined with the oven to an upstanding position for the placement and removal of food on the prong when the shank is retracted; the mounting means including spaced ears and the bearing block being pivoted intermediate its ends between said ears, and a stop between the ears to limit down-swing of the block to a substantially horizontal position whereby to assure the alining of the shank with the oven.

2. A food roasting unit comprising a base, an elongated horizontal cooking oven on the base, the oven being open at one end, an elongated shank having a food engaging prong on one end adapted to enter the open end of the oven, means on the base mounting the shank for movement of the shank from a horizontal position wherein the prong is within the oven to an upstanding and retracted position wherein the prong is clear of the oven for the placement and removal of food, and means arranged in connection with the mounting means to limit the downward movement of the shank to such horizontal position.

CLIFTON J. PAUL.

REFERENCES CITED

The following references are of record in the file of this patent:

UNITED STATES PATENTS

| Number | Name | Date |
|---|---|---|
| 568,962 | Skeels | Oct. 6, 1896 |
| 1,718,961 | Humphrey | July 2, 1929 |
| 1,809,172 | Le Sauvage | June 9, 1931 |
| 1,887,219 | Stranszky | Nov. 8, 1932 |
| 1,910,682 | Dumas | May 23, 1933 |
| 2,019,170 | Barlow | Oct. 29, 1935 |
| 2,020,808 | Speakman | Nov. 12, 1935 |
| 2,377,873 | Finizie | June 12, 1945 |
| 2,484,858 | Schmidt | Oct. 18, 1949 |
| 2,485,890 | Keljik | Oct. 25, 1949 |
| 2,517,448 | Schmeling | Aug. 1, 1950 |

FOREIGN PATENTS

| Number | Country | Date |
|---|---|---|
| 19,462 | Great Britain | Dec. 1, 1900 |